(No Model.)
H. H. KELLEY.
BRAKE MECHANISM FOR STREET CARS.
No. 473,510. Patented Apr. 26, 1892.
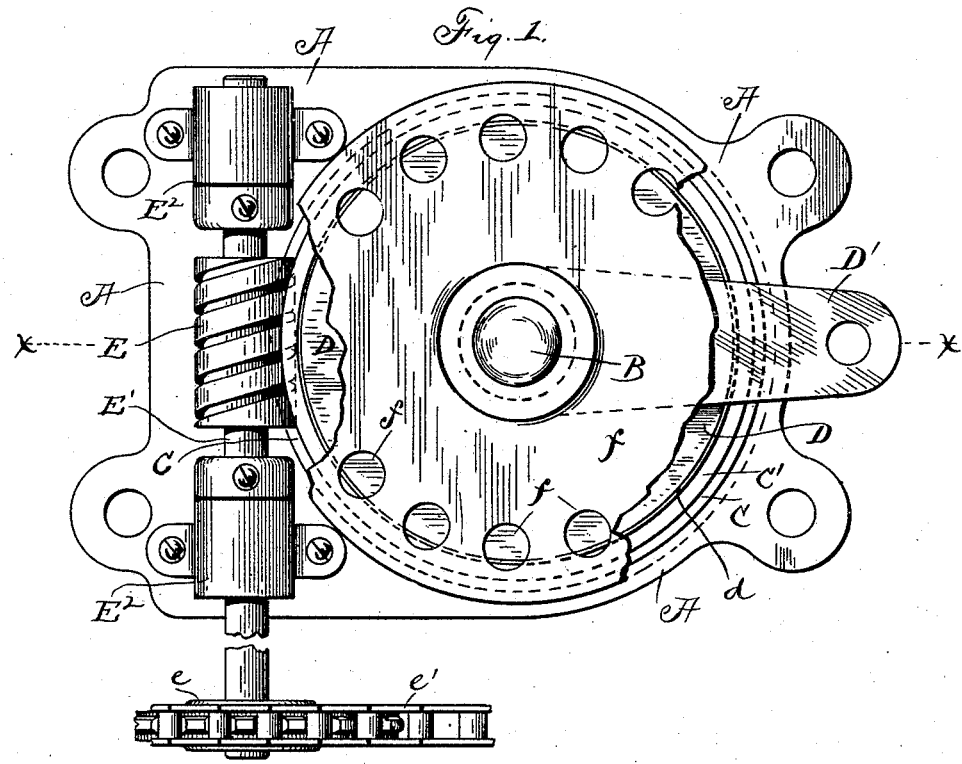
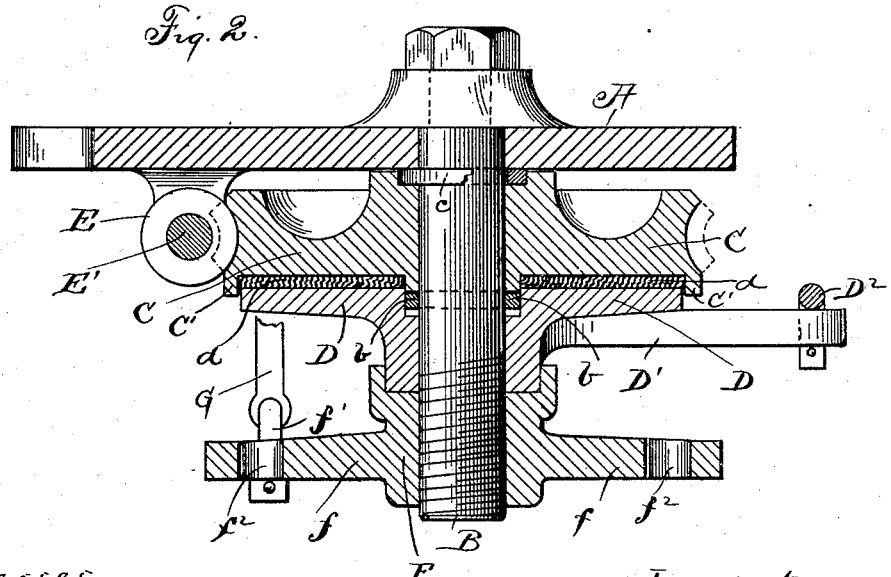
Witnesses.
E. Byron Gilchrist
C. H. Doren
Inventor:
Harry H. Kelley
By Seggett & Seggett
Attorneys.

UNITED STATES PATENT OFFICE.

HARRY H. KELLEY, OF WILLOUGHBY, OHIO.

BRAKE MECHANISM FOR STREET-CARS.

SPECIFICATION forming part of Letters Patent No. 473,510, dated April 26, 1892.

Application filed August 22, 1891. Serial No. 403,424. (No model.)

*To all whom it may concern:*

Be it known that I, HARRY H. KELLEY, of Willoughby, in the county of Lake and State of Ohio, have invented certain new and useful Improvements in Brake Mechanism for Street-Cars; and I do hereby declare the following to be a full, clear, and exact description of the invention, such as will enable others skilled in the art to which it pertains to make and use the same.

My invention relates to improvements in brake mechanism for street-cars; and it consists in certain features of construction and in combination of parts hereinafter described, and pointed out in the claims.

In the accompanying drawings, Figure 1 is a plan of a device embodying my invention. Fig. 2 is an elevation in section on line $x\ x$, Fig. 1.

A represents a metal plate supposed to be bolted to the under side of the car-body and to constitute the supporting member of the device.

B is a depending stud secured, as shown, to plate A. On stud B is mounted, with an easy fit, the worm-gear C and the friction-disk D in the order shown. A collar $c$ is interposed between the hub of gear C and plate A, and this collar can be cheaply renewed from time to time, when necessary, from the wear of the parts. A collar $b$ is mounted on the stud next below the worm-gear, this collar having a tight fit on the stud, so as to sustain the weight of gear C. Between the opposing flat surfaces of members C and D is interposed a friction-disk $d$, preferably of paper. Gear C has a depending rim C', that extends down outside of disk D to keep the oil off from the latter. E is a worm engaging gear C. This worm is mounted on shaft E', the journal-boxes $E^2\ E^2$ of this shaft being fastened to the under side of plate A. On the overhanging end of this shaft is mounted a sprocket-wheel $e$, connected by endless chain $e'$ with a similar sprocket-wheel (not shown) that is supposed to be mounted on the car-axle, and by means of which motion is transmitted from the car-axle to shaft E', and from thence to gear C. The lower end of stud B is screw-threaded and provided with a nut F, by tightening which disk D is forced upward, thereby clamping member $d$ between members C and D, so that the movement of the former is transmitted by friction to the latter. Nut F is provided with a wheel $f$, the latter being operatively connected, usually by means of a link $f'$, with hand-lever G, this lever being supposed to extend up through the car-floor to where it may be easily reached by the operator. Disk D is provided with an arm D', the free end of this arm being connected with a rod $D^2$, that in turn is supposed to connect with an equalizing-bar, (not shown,) or to connect with whatever may take the place of an equalizing-bar in operating the brake-beam in setting the brakes. The brake-beams, brake-shoes, and equalizing-lever are supposed to be of ordinary construction and arrangement, and hence need not be shown. By operating nut F by means of the hand-lever— say from an eighth to a quarter turn—disk D is rotated, say, a quarter-turn, more or less, in setting the brakes. When nut F is reversed or loosened, disks $b$ and $d$, by gravity, back away from member C, so that there is no friction between these members except in applying the brake. This is a matter of considerable importance, for if stud B were horizontal a spring or some kind of device would have to be provided to back disk D to prevent undue friction and wear. Disk $d$ is easily renewed from time to time to take up the wear of the parts. Wheel $f$ is provided with a series of holes $f^2$, so that link $f'$ can be changed from one hole to another as the parts wear.

What I claim is—

1. In brake mechanism for street-cars, a supporting-plate for attaching to the bottom of the car-body, such plate bearing a depending stud or shaft on which is journaled a worm-gear next the plate and a co-operating friction-disk below the worm-gear, such disk having an arm for actuating the brake, a nut for elevating the friction-disk, such nut having a wheel connecting with the hand-lever, and a worm engaging the worm-gear, such worm being operatively connected with the car-axle, substantially as set forth.

2. In brake mechanism for street-cars, a worm-gear and co-operating friction-disk having a vertical axis in common, the disk being located below the gear and having an arm for actuating the brakes, a nut for elevating the disk, the latter being adapted to back away from the opposing gear by gravity, substantially as set forth.

In testimony whereof I sign this specification, in the presence of two witnesses, this 23d day of July, 1891.

HARRY H. KELLEY.

Witnesses:
C. L. CUTTER,
W. H. PARK.